Patented July 29, 1952

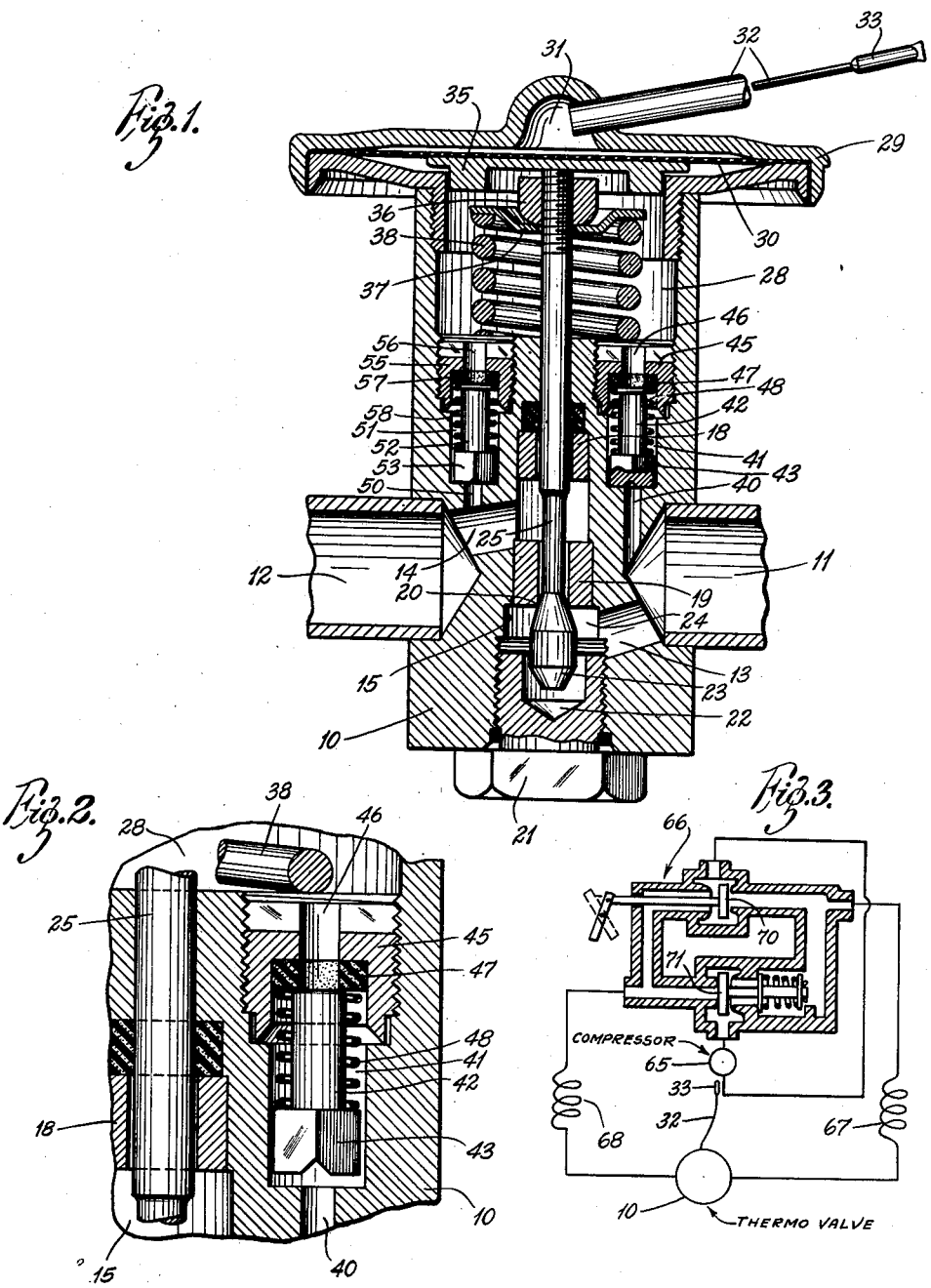

2,605,050

UNITED STATES PATENT OFFICE 2,605,050

SELF-EQUALIZING THERMAL VALVE

Franklin M. MacDougall, Kirkwood, Mo., assignor to Alco Valve Company, University City, Mo., a corporation of Missouri Application December 13, 1946, Serial No. 716,151

11 Claims. (Cl. 236—92)

The present invention relates to a self-equalizing thermovalve. A thermovalve is a thermostatic expansion valve that maintains constant superheat in a refrigeration line, or the like.

It is an object of the invention to provide a thermovalve which has means to operate a diaphragm thermostatically, and means to oppose the thermostatic operation by the pressure conditions in the outlet side of the valve, together with means to equalize inlet and outlet pressures across the valve when the differential between outlet and inlet pressure falls to a predetermined value.

More particularly, it is an object of the invention to provide a supplemental valve means in a thermovalve that is disposed between the inlet side of the thermovalve and the lower side of the diaphragm, which supplemental valve is normally closed when inlet pressure is high relatively to outlet pressure, but which valve opens when the differential between outlet and inlet pressure is lowered to a predetermined value, to permit equalization of pressures across the main valve.

A further object of the invention is to provide a thermovalve with means to enable pressures to equalize on the inlet and outlet sides quickly upon reduction of inlet pressure as by stopping the compressor.

A further object of the invention is to provide a thermovalve that has a particular adaptation to reverse cycle refrigeration where one side of the valve may at one time be the inlet and at another time be the outlet. In this connection, it is a broad object of the invention to provide means that prevents the thermovalve from acting as a lock that locks up high pressure on the outlet side of a thermovalve in a reverse cycle system when the cycle is reversed. It is a specific object to provide a thermovalve that will cause inlet and outlet pressures to equalize quickly, regardless of the direction of flow through the valve.

In the drawings:

Fig. 1 is a vertical section through the middle of a valve of this type;

Fig. 2 is an enlarged view of one of the control check valves shown in Fig. 1, in closed position; and Fig. 3 is a diagram of a reverse cycle refrigeration system embodying the present valve.

The valve is shown as having a body 10, which in this instance is cylindrical. This body is provided with connections which will initially be described as an inlet 11 and an outlet 12 that connect into passages 13 and 14, respectively. The two passages 13 and 14 open into a bore 15, having varying diameters. At its upper end, this bore receives a tubular packing gland 18. Between the inner ends of the passages 13 and 14, the bore 15 fixedly receives a cylindrical constricting element 19 that has a valve seat 20 at its lower end. The bottom of the bore 15 is closed by a removable plug 21 that may have a recess 22 therein.

A valve head 23 is disposed within the chamber 24 formed of the lower part of the bore 15 enclosed by the plug 21. This valve head 23 is attached to a valve stem 25 that passes through the constriction 19 and the packing gland 18. It is guided slidably in a partition wall formed in the housing above the top of the bore 15.

The upper end of the housing is recessed to form a pressure chamber 28. This pressure chamber receives a diaphragm head 29 that is threadedly attached thereto in the manner shown. This diaphragm head provides a flexible diaphragm 30 with a pressure chamber 31 thereabove, the lower surface of the diaphragm being open to the chamber 28. The upper diaphragm chamber 31 receives the end of a tube 32 connected to a temperature bulb 33 in the manner known to the art.

The upper end of the valve stem engages the underside of a baffle plate 35 that is actuated by the lower surface of the diaphragm 30. Beneath the baffle plate, the valve stem 25 is threaded to receive an adjusting nut 36 that abuts a washer 37 holding one end of a compression spring 38. The other end of this compression spring engages the bottom surface of the pressure chamber 28. It will be seen that this compression spring 38 opposes the expansion force of the fluid acting within the upper diaphragm chamber 31, and that its effect may be regulated by the nut 36.

The foregoing represents a well known type of thermostatic expansion valve. Other types are also known, and the subject matter of this invention may also be used on them.

A port 40 extends from the inlet 11 upwardly within the wall of the housing 10. This port opens into a valve chamber 41 that receives a check valve 42. This check valve has a squared head 43 shaped to prevent it from sealing off the port 40. A valve seat plug 45 is threaded into an enlargement forming a continuation of the recess 41. This plug has a passage 46 therethrough and a valve seat 47 which likewise has a continuation through it of the passage 46. A coil spring 48 of desired strength normally urges the valve 42 downwardly. When this valve is urged upwardly, its upper end may engage the seat 47 to prevent communication through the seat, and to close off the port 46.

The outlet 12 is provided with a similar port 50 that opens into a valve chamber 51. It receives a valve 52. The valve 52 has a squared head 53. An upper plug 55 has a port 56 therethrough. A valve seat 57 has a central opening that is a continuation of the port 56 and is adapted to be engaged by the valve 52. This valve is normally urged downwardly to open position by a spring 58. The two check valves are shown as identical.

As already noted, this valve has particular value in connection with reverse cycle refrigeration, such as is described in Patent No. 2,486,608, issued November 1, 1949, in the name of this inventor and assigned to the same assignee. Such system is indicated diagrammatically in Fig. 3. In such systems, there is a compressor 65 that delivers the hot gas to a reversing valve mechanism 66. This valve mechanism 66 may deliver the gas to one coil 67 acting as a condenser, whence it is delivered to the thermo valve 10, is there expanded, and is directed to a second coil 68 acting as an evaporator. From the evaporator, it is drawn back to the reversing valve mechanism and delivered to the inlet side of the compressor. The reversing valve mechanism includes a manually shiftable main valve 70, operable between two valve seats as shown. There is a normally neutralized inlet valve 71, operable between two valve seats, but normally urged by a spring into medial position between the seats. As indicated, the main valve 70 determines which coil is connected to the compressor suction line, and the valve 71 determines which coil is connected to the compressor outlet line.

*Operation*

In operation, as described in the copending application, the manual valve is placed in one position. At the start of the compressor, the inlet valve 71 is neutralized. Hence the compressor is short circuited to the left of the valve 71 in Fig. 3, thence to the left of the valve 70, and back to the compressor. This short circuit prevents much flow through the coils. But the pressure drop across the inlet valve 71, to the left, is great, and compressor pressure acts to the right of this inlet valve. This pressure differential causes the inlet valve to seat to the left, breaking the short circuit, directing flow to the coils, and applying full inlet pressure to the right of the inlet valve 71, and causing the left of this valve to be subjected to compressor suction pressure.

Under such conditions, the refrigerant enters the coil 67, and is condensed. From this coil, the refrigerant is delivered to the inlet 11 of the thermovalve. This gas expands through the thermovalve and is delivered from it to the coil 68 acting as an evaporator. From this coil 68, it returns to the reversing valve mechanism and is delivered to the inlet side of the compressor.

Assuming the reversing valve fixed in the foregoing position, the arrangement represents a conventional refrigeration system, with the invention hereof present. The high pressure refrigerant in the inlet 11 is expanded across the valve 23, and emits into the outlet 12 at a much reduced pressure. At the start, the inlet pressure will act upon the bottom of the equalizing check valve 42, against the force of the spring 48 and the pressure in the chamber 28. This latter pressure will be substantially outlet pressure, because the lower outlet pressure is insufficient to close the valve 52, which remains open. This pressure difference, representing also the flow pressure drop across the valve 42 when the system is operating, will close the valve 42 against the spring 48, which does not exert enough force to maintain the valve open when the inlet and outlet pressures are at normal operating values.

Then the thermovalve will operate as a conventional thermovalve, with its temperature diaphragm acting against outlet pressure.

If for any reason the differential between inlet and outlet pressures is lowered to a value below that regulated by the force of the spring 48, the valve 42 will open. If the system is operating, this will admit inlet gas to the chamber 28, tending to close the valve 23, throttling the flow therethrough, and reducing, for example, the compressor load until outlet, or evaporator pressure, is again lowered to reestablish the former differential. If the compressor is stopped, and the valve 23 is closed, the inlet pressure will rapidly fall, while evaporator pressure usually rises, so that the differential falls below that determined by the valve design and the spring 48. Thereupon the valve 42 will open and the inlet and outlet pressures may rapidly equalize.

The differential, determined in this illustration largely by the spring 48, should usually be closely below the minimum operating differential of the main valve, so that the relief valve will open as early as possible after a shut-down of the compressor with the valve 23 closed. Of course, any pressure differential may be used as desired and for the purposes desired. Where the valve 42 is used to prevent excessive evaporator or other outlet pressures when the valve 23 is open and the system operating, the design will be made accordingly. It will, of course, be obvious that the type of check valve may be widely varied, although the one shown has virtues of simplicity, compactness, and accuracy in operation.

In addition to the foregoing description, applicable to a one-way refrigeration cycle, this invention has especial value with reverse cycle systems. Problems arise in connection with such operations through reversing valve mechanisms, as set forth in the copending application mentioned.

To reverse the refrigeration system, the manually operated valve 70 is shifted by hand to seat to the left, so that the coil 68, formerly connected to the low side of the compressor, is cut off. This may occur while the compressor is operating. Compressor pressure then acts upon the right side of the valve 71, urging it to seat to the left in such manner as also to cut the aforesaid coil 68 off from the high side of the compressor. The result of this is that the particular coil that has been acting as an evaporator, here indicated as the coil 68, is cut off from both sides of the compressor, and the compressor is short circuited, until the pressures acting oppositely on the valve 71 approach each other and establish such low differential, plus or minus, or zero, that the spring can open the valve 71. Such pressure equalization is obtained only when the pressure trapped within the evaporator can build up to such a point that it forces the valve open against the compressor pressure acting on the other side.

It, therefore, can be seen that there may be a substantial delay in the functioning of the reversing valve mechanism, owing to the fact that it and the thermovalve may trap pressure in the evaporator coil that is too low to force the reversing valve element over. The present invention is designed to overcome this trapping effect by the thermovalve, without destroying the ability of the thermovalve to act as a constant superheat mechanism.

It will be seen that the circumstances previously set forth involve a situation in which the outlet side 12 of the thermovalve has gas trapped in it at a relatively low temperature and pressure. The inlet 11, which was formerly subjected to the compressor pressure as modified by the intervening coil, is subjected to only a declining pressure because of the short circuiting of the compressor through the reversing valve mechanism. As the inlet pressure goes down, it will reach a point where it cannot overcome the force of the spring 48 acting to lower the valve 42, aided by outlet pressure. Thereupon, the valve 42 will open, and will admit inlet pressure to the chamber 28, which acts also to maintain the valve 52 open. Thereupon, the pressures on opposite sides of the thermal valve will quickly equalize and the relatively high pressure in the inlet 11 will be delivered to the reversing valve to cause the same to open without undue delay. It is also evident that the foregoing equalizing valve arrangement will operate regardless of which direction the flow is through the expansion valve. If the system is reversed from the direction described, the valve 52 checks under inlet pressure then acting in the connector 12. The springs 48 and 58 may be chosen to provide the proper differential of pressures between inlet and outlet at which the two check valves will be opened. Such differential will be lower than the normal operating differential produced by the expansion of the gases across the expansion valve. Conventionally, the two springs 48 and 58 will have the same characteristics, but they may be different where conditions require.

By the foregoing means, the typical thermal valve operation may be obtained, and yet equalization of pressures across the thermovalve likewise may be obtained quickly after a shut-down of the refrigeration system with the thermovalve closed. It is preferable to employ the foregoing arrangement with a so-called internal equalization type of valve. However, the ports 40 and 50 leading to the chamber 28 may, under some circumstances, be connected elsewhere into the system, such as on the compressor sides of the coils 67 and 68 in Fig. 3, which would produce what is generally known as external equalization of the thermovalve.

What is claimed is:

1. A thermostatic expansion valve having a housing, an inlet and an outlet in the housing, a main valve passage in the housing between the inlet and the outlet, a main expansion valve cooperable with the passage, a thermal expansion chamber having a movable wall for operating the valve, a pressure chamber in the housing, containing said wall, and sealed from the thermal expansion chamber, first port means into the pressure chamber for connection with the outlet side of the main valve, second port means into the pressure chamber for connection with the inlet side of the main valve, and check means to control the flow through the second port means, said check means comprising a check valve closed when pressure at the inlet side of the second port means exceeds the pressure in the pressure chamber by a predetermined amount, and opened when the aforesaid difference in pressures at the inlet side of said second port means and in the pressure chamber is less than said predetermined amount.

2. A thermostatic expansion valve having a housing, an inlet and an outlet in the housing, a main valve passage in the housing between the inlet and the outlet, a main expansion valve cooperable with the passage, a thermal expansion chamber having a movable wall for operating the valve, a pressure chamber in the housing, containing said wall, and sealed from the thermal expansion chamber, first port means into the pressure chamber for connection with the outlet side of the main valve, second port means into the pressure chamber for connection with the inlet side of the main valve, check means to control the flow through the second port means, said check means comprising a check valve closed when pressure at the inlet side of the second port means exceeds the pressure in the pressure chamber by a predetermined amount, and opened when the aforesaid difference in pressures at the inlet side of said second port means and in the pressure chamber is less than said predetermined amount, and similar check means in the first port means, operable when the direction of flow through the main valve passage is reversed.

3. A thermostatic expansion valve having a housing, an inlet and an outlet in the housing, a main valve passage in the housing between the inlet and the outlet, a main expansion valve cooperable with the passage, a thermal expansion chamber having a movable wall for operating the valve, a pressure chamber in the housing, containing said wall, and sealed from the thermal expansion chamber, first port means into the pressure chamber for connection with the outlet side of the main valve, second port means into the pressure chamber for connection with the inlet side of the main valve, check means to control the flow through the second port means, said check means comprising a check valve closed when pressure at the inlet side of the second port means exceeds the pressure in the pressure chamber by a predetermined amount, and opened when the aforesaid difference in pressures at the inlet side of said second port means and in the pressure chamber is less than said predetermined amount, and means to selectably change the predetermined pressure differential at which the check valve closes and opens.

4. A thermostatic, constant superheat type of expansion valve, including a housing, an inlet and an outlet therein, a valve passage between the inlet and the outlet, an expansion valve movable to cooperate with the passage to regulate fluid flow through the passage and produce a pressure drop in the fluid, a thermostatic unit on the housing including an expansible wall, a pressure chamber in the housing to receive fluid pressure acting against thermostatic displacement of the wall, means connecting the wall and the expansion valve, a first passage in the housing between the outlet and the pressure chamber, a second passage in the housing between the inlet and the pressure chamber, a valve in the first passage adapted to be urged closed by action of fluid pressure differences between the inlet and the pressure chamber, and opened when the said pressure differences are below a predetermined value.

5. A thermostatic, constant superheat type of expansion valve, including a housing, an inlet and an outlet therein, a valve passage between the inlet and the outlet, an expansion valve movable to cooperate with the passage to regulate fluid flow through the passage and produce a pressure drop in the fluid, a thermostatic unit on the housing including an expansible wall, a pressure chamber in the housing to receive fluid pressure acting against thermostatic displacement of the wall, means connecting the wall and the expansion valve, a passage into the pressure chamber for connection with the outlet side of the valve whereby a fluid pressure may be introduced into the chamber in opposition to the thermostatic action of the wall, a second passage from the inlet side of the valve, to establish communication with the outlet side of the valve, check valve means in said passage subjected to a pressure on one side that is a function of inlet pressure and subjected oppositely to a pressure that is a function of outlet side pressure, said check valve means being thereby operable to close the second passage when inlet pressure exceeds outlet pressure by a predetermined amount, and otherwise to open.

6. A thermostatic, constant superheat type of expansion valve, including a housing, an inlet and an outlet therein, a valve passage between the inlet and the outlet, an expansion valve movable to cooperate with the passage to regulate fluid flow through the passage and produce a pressure drop in the fluid, a thermostatic unit on the housing including an expansible wall, a pressure chamber in the housing to receive fluid pressure acting against thermostatic displacement of the wall, means connecting the wall and the expansion valve, a passage into the pressure chamber for connection with the outlet side of the valve whereby a fluid pressure may be introduced into the chamber in opposition to the thermostatic action of the wall, a second passage from the inlet side of the valve, to establish communication with the outlet side of the valve, check valve means in said passage subjected to a pressure on one side that is a function of inlet pressure and subjected oppositely to a pressure that is a function of outlet side pressure, a spring acting in aid of outlet pressure on the valve, said check valve means being thereby operable to close the second passage when inlet pressure exceeds outlet pressure by a predetermined amount, and otherwise to open.

7. A thermostatic, constant superheat type of expansion valve having a housing, an inlet and an outlet in the housing, an opening in the housing at the end of each, a valve seat means between said openings, an expansion valve in one opening cooperable with the seat, a valve stem for operation of the valve, a pressure chamber recess in the housing, separated from the openings, and into which the valve stem projects, a movable wall removably connected with the housing to close the recess, thermostatic means to actuate the wall from the side outside the pressure chamber, the wall being connectable with the valve to operate it, spring means acting to oppose operation of the valve by movement of the wall into the chamber, a passage from the inlet to the chamber, a passage from the outlet to the chamber, said passages opening through the housing into the chamber, a check valve in each passage, means removable through the chamber for permitting insertion and removal of the check valves.

8. A thermostatic, constant superheat type of expansion valve having a housing, an inlet and an outlet in the housing, an opening in the housing at the end of each, a valve seat means between said openings, an expansion valve in one opening cooperable with the seat, a valve stem for operation of the valve, a pressure chamber recess in the housing, separated from the openings, and into which the valve stem projects, a movable wall removably connected with the housing to close the recess, thermostatic means to actuate the wall from the side outside the pressure chamber, the wall being connectable with the valve to operate it, spring means acting to oppose operation of the valve by movement of the wall into the chamber, a passage from the inlet to the chamber, a passage from the outlet to the chamber, said passages opening through the housing into the chamber, a check valve in each passage, means removable through the chamber for permitting insertion and removal of the check valves, said check valves having pressure surfaces opposite the chamber and pressure surfaces toward the chamber, said removable means having valve seats for engagement by the check valves, and springs retained by the removable means and acting to urge the valves away from their seats.

9. A thermostatic expansion valve having a housing, an inlet and an outlet in the housing, a main valve passage in the housing between the inlet and the outlet, a main expansion valve cooperable with the passage, a thermal expansion chamber sealed from said main valve passage and having a movable wall for operating the valve, bypass means in the housing between the inlet and the outlet, and means separate from the main valve and responsive to pressure differences between the inlet and the outlet to control the opening and closing of said bypass means regardless of the position of the main valve.

10. A device of the type described, comprising a housing; an inlet and an outlet in the housing; a main valve passage in the housing between the inlet and the outlet; a main expansion valve cooperable with the passage; a chamber in the housing; a first port means leading into the chamber for connection with the outlet side of the main valve; a second port means leading into the chamber for connection with the inlet side of the main valve; check means for controlling the flow through the second port means, said check means including a check valve which is closed when pressure at the inlet side of the second port means exceeds the pressure in the chamber by a predetermined amount, and opened when the aforesaid difference in pressure is less than said predetermined amount; and similar check means in the first port means operable in a like manner when the direction of flow through the main valve passage is reversed.

11. A thermostatic expansion valve, comprising a housing; an inlet and an outlet leading into said housing; a main valve passage in the housing connecting the inlet and the outlet; a main expansion valve cooperable with the passage; thermal responsive means independent of and sealed from fluid pressure in said inlet or outlet for operating said valve; bypass means between the inlet and the outlet; and means separate from the main valve and responsive to pressure differences between the inlet and the outlet to control the opening and closing of said bypass means regardless of the position of the main expansion valve.

FRANKLIN M. MacDOUGALL.

REFERENCES CITED

The following references are of record in the file of this patent:

UNITED STATES PATENTS

| Number | Name | Date |
| --- | --- | --- |
| 1,583,834 | Humphrey | May 11, 1926 |
| 1,718,644 | Gilbert | June 25, 1929 |
| 2,081,845 | Zwickl | May 25, 1937 |
| 2,097,585 | Carson | Nov. 2, 1937 |
| 2,290,838 | White | July 21, 1942 |
| 2,415,475 | Eshbaugh | Feb. 11, 1947 |